United States Patent
Olding et al.

(10) Patent No.: US 8,634,423 B1
(45) Date of Patent: Jan. 21, 2014

(54) DETERMINING A QUALITY-OF-SERVICE PRIOR TO REGISTERING A WIRELESS DEVICE

(75) Inventors: Doug A. Olding, Overland Park, KS (US); Warren B. Cope, Olathe, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1201 days.

(21) Appl. No.: 11/735,033

(22) Filed: Apr. 13, 2007

(51) Int. Cl.
H04L 12/28 (2006.01)
H04L 1/00 (2006.01)

(52) U.S. Cl.
USPC .................... 370/395.21; 370/230

(58) Field of Classification Search
USPC .......... 455/439; 709/226, 228, 224; 370/352, 370/389, 311, 230, 395.21; 713/182
See application file for complete search history.

(56) References Cited

U.S. PATENT DOCUMENTS

| | | | |
|---|---|---|---|
| 7,359,967 B1 * | 4/2008 | Synnestvedt et al. | 709/224 |
| 7,369,856 B2 * | 5/2008 | Ovadia | 455/439 |
| 7,443,835 B2 * | 10/2008 | Lakshmi Narayanan et al. | 370/352 |
| 7,483,984 B1 * | 1/2009 | Jonker et al. | 709/226 |
| 2002/0114321 A1 * | 8/2002 | Ogren | 370/352 |
| 2005/0025136 A1 * | 2/2005 | Anschutz et al. | 370/352 |
| 2006/0274743 A1 * | 12/2006 | Yegin et al. | 370/389 |
| 2007/0136602 A1 * | 6/2007 | Park et al. | 713/182 |
| 2007/0168523 A1 * | 7/2007 | Jiang et al. | 709/228 |
| 2007/0171850 A1 * | 7/2007 | Feder et al. | 370/311 |
| 2009/0019163 A1 * | 1/2009 | Pecus | 709/226 |

* cited by examiner

Primary Examiner — Mark Rinehart
Assistant Examiner — Gbemileke Onamuti

(57) ABSTRACT

Methods and media are provided for allowing WiMAX device users varying levels of Quality of Service (QoS) based on the network service provider ID (NSPID) present on the device. A user's authentication request can be routed based on the NSPID, thus ensuring certain prescribed QoS levels. The QoS level could be varied over time as requested by the user. Guarantee of the QoS levels can be accomplished by dedicating network resources, such as the number of servers, the quality of servers, or the bandwidth allocated. Utilizing the NSPID to route the user prior to authentication also improves latency time for user-authentication requests and improves traffic flow across the network by reducing the need to reroute.

19 Claims, 4 Drawing Sheets

DETERMINING A QUALITY-OF-SERVICE PRIOR TO REGISTERING A WIRELESS DEVICE

INTRODUCTION

User expectations of the Quality of Service (QoS) offered in a communications network continue to arise. Whether speed is paramount or reliability is more important, customers may require or desire that specific benchmarks be met. Anything less creates frustration and discontent. This is especially true in wireless-communications environments, such as cellular-type communications networks.

Emerging technologies leverage the standards consistent with WiMAX (Worldwide Interoperability for Microwave Access), promulgated by the WiMAX forum. An illustrative standard includes the IEEE 802.16 standard, which is incorporated herein by reference to provide background information associated with the evolving standard (including amendments designated by letter, such as a,b,c,d,e,f and beyond). WiMAX devices take on various forms (phones, PDAs, etc.) and operate at differing QoS levels. The lowest of these levels includes best-effort transmissions that don't guarantee either specific transmission speed nor allotted bandwidth. But as QoS guarantees increase, service levels can require the ability to deliver variable, especially 'high,' capabilities in real-time. An illustration of a higher-capability QoS level would be one to be used to communicate compressed voice or video that requires minimum speed and bandwidth requirements over a certain period of time, which would be difficult if not impossible to provide as one of a set of options absent embodiments of the present invention.

As the standards have been updated, WiMAX devices have gone through several upgrades or generations. At present, fourth generation (4G) WiMAX devices are the most advanced in the field. However, even these devices suffer from some of the same drawbacks as those offered previously. One of these drawbacks is that a user must be authenticated to the provider network in order to assess the QoS level associated with the user or the connection. This requires receiving a provisioning request from the user, providing an answer from the server, and potentially rerouting the connection in order to meet the prescribed QoS level—but even so, no analysis and determination of service provision may be made prior to an attempted communication initiation. Provisioning a call can take on the order of seconds. Any delay can be quite significant regarding various computing aspects as well as to the user wishing to connect quickly to the network.

Any number of things can affect QoS. If there is a large demand for access to a communications tower for example, then some people may not even have access to it. And even those that connect to it, may have to share bandwidth or other resources, such as hardware resources. The current state of the art could generally be improved if, among other things, the QoS level could be associated with a WiMAX device, and further could be determined prior to authentication so as to improve latency time and traffic flow.

SUMMARY

The present invention is defined by the claims below. Embodiments of the present invention solve at least the above problems by providing media and methods for, among other things, determining a Quality of Service (QoS) level that a WiMAX customer should receive prior to authenticating that user to a network. Embodiments of the present invention have several practical applications in the technical arts including reducing the time it takes to authenticate a user, improving the routing of users communications requests, more efficiently using network resources and servers, and providing a certain level of QoS based on attributes that are considered before a device is authenticated to a communications network.

In a first aspect, a method according to an embodiment of the present invention includes creating one or more network-service identifiers ("identifiers") that identify one or more resources that are associated with providing varying QoS levels that respectively correspond to the one or more identifier; associating one of the one or more identifiers with a wireless communications device; providing the identifier to the communications device; during a provisioning request but prior to completing an authentication process of the communications device, providing the identifier to a telecommunications network; and ultimately conditioning access to the one or more resources that provide a predetermined QoS level consistent with the identifier.

In another embodiment, a method includes associating a wireless device with an address that is associated with resources capable of providing a minimum service level; receiving a provisioning request from the device, wherein the address is received along with the provisioning request; prior to authenticating the device, allocating the resources to the wireless device based on the address; and providing the minimum service level by establishing a communications pathway between the device and the at least a portion of the resources.

In a final illustrative embodiment, a method includes receiving an address of a wireless communications, wherein the address is indicative of the prescribed QoS level; routing data from the wireless device according to the QoS level, and providing the wireless device access to a set of resources consistent with the QoS level.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide media and methods for authenticating a WiMAX-compatible device to a telecommunications network. A network service provider identification (NSPID) is provided to users based on the level of priority at which they are entitled access on the network. Subsequent authentication requests and connectivity to the network is based on this ID.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 4G | Fourth Generation |
| ASN | Access Services Network |
| CSN | Connectivity Services Network |
| DM | Device Manager |
| NSPID | Network Service Provider Identification |
| OMA | Open Mobile Alliance |
| QoS | Quality of Service |
| SIM | Subscriber Identity Module |
| WiMAX | Worldwide Interoperability of Microwave Access |

Further, various technical terms are used throughout this description. A definition of such terms can be found in Newton's Telecom Dictionary by H. Newton, 22nd Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, or computer-executable instructions embodied on computer-readable media. Accordingly, the embodiments may take the form of a hardware embodiment, a software embodiment, or an embodiment combining software and hardware.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
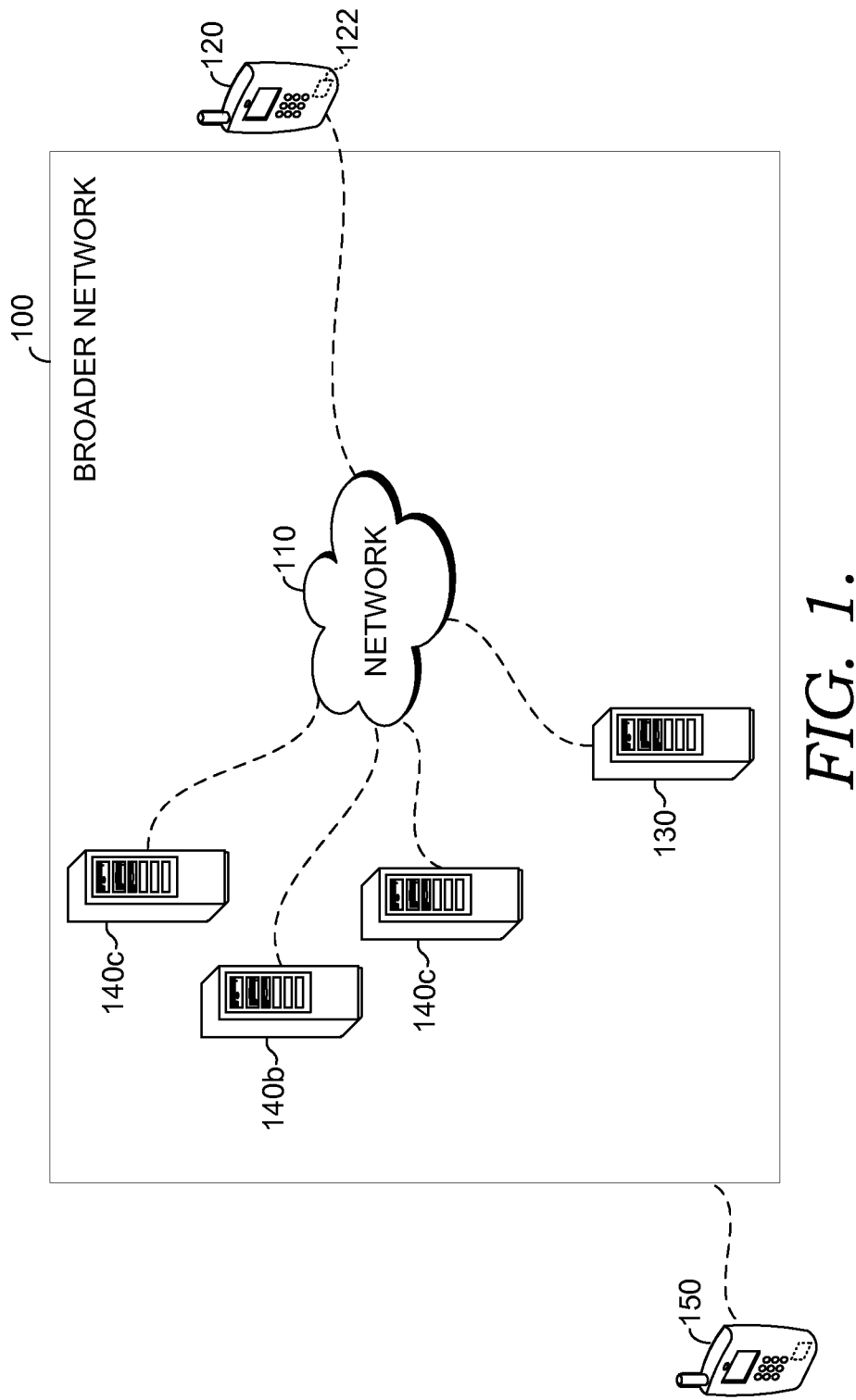
FIG. 1 is an exemplary network in which an embodiment of the present invention may be practiced.

Turning to FIG. 1, an exemplary telecommunications network 100 is depicted within which embodiments of the present invention may be practiced. Telecommunications network 100 is meant to provide only one environment in which the embodiments of the present invention may be executed and is not meant to add limitation to the claimed embodiments. Within telecommunications network 100 is wireless network 110, which can include any number of transmission and/or reception devices and even can be telecommunications network 100. Such devices include, but are not limited to, base stations (i.e., cellular towers), gateways, servers, switches, routers, repeaters or other equipment (not shown so as to not obscure the present invention) to connect a wireless device 120 to a serving computer 130, and ultimately to any number or a myriad of different types of devices, illustratively represented by numeral 150, which does not need to be a phone but could be a media source or download site or land line, etc.

It should be understood that wireless network 110 will have a bandwidth associated with it that conveys the network's capacity to transmit data. On a digital network, this is typically denoted by a capacity to transmit a particular data amount in a given timeframe, i.e., 1.544 megabits per second. This capacity can be different for various portions of the network, or uniform throughout. The bandwidth of network 110 could also be apportioned according to any number of factors, which include but are not limited to subscription rates, classification such as business use or home use, or based upon device type. Thus, a carrier can reserve bandwidth for wireless internet access or for cellular phones, determine that homes and businesses are receive 50 percent each, or that broadband subscribers are to enjoy 90 percent of the network's capacity. The bandwidth of network 110 is understood to be a dynamic parameter and one that the carrier can manipulate depending on the carrier's and its users' needs.

Wireless device 120 includes a network service provider ID (NSPID) 122. This ID is used by the network (which may also have advance knowledge of the ID) to identify the carrier for that particular user. In an example according to an embodiment of the invention, a first user that has a service plan with a first carrier would have a corresponding ID that identifies that user (by way of the user's device in one embodiment) with a first carrier. A second user may have an ID identifying that person as being associated with a second carrier. If this second user switches to the first carrier, then the switching user's NSPID will be adjusted to reflect the move transition. The NSPID that is present on wireless device 120 is also transmitted by the base stations of wireless network 110 in one embodiment. In some embodiments, multiple NSPIDs are transmitted by the base stations. During a provisioning request, discussed in greater detail below, the NSPID(s) transmitted are matchable to wireless devices to determine a QoS to be associated with the wireless device.

According to an embodiment of the present invention, NSPID 122 can be assigned by server 130. In other embodiments, it can be locally assigned. Server 130 receives a provisioning request and assigns the required ID to wireless device 120. As will be described in greater detail, if a telecommunications carrier is associated with multiple IDs to transmit, the carrier can transmit different NSPIDs to wireless device 120 in order to identify a user. An embodiment of the present invention utilizes multiple NSPIDs to differentiate users on a carrier's network to provide varying QoS levels.

Network 100 also includes other servers, which may include servers 140a, 140b and 140c. While three servers are shown by way of illustration, any number of servers, including dedicated servers, may be used that facilitate communications services to wireless device 120. Dedicated servers are used to provide varying levels of service so that a user's QoS level can be guaranteed in one embodiment.

Various levels of QoS may be offered. They may be somehow denoted as offering higher levels of QoS than other levels. By way of example, "Gold" users may pay a higher subscription rate to be guaranteed a higher QoS level than a "Silver" user that pays a lower rate. "Bronze" users may be the users that pay the lowest rate, and may be guaranteed a lower QoS than Silver users.

Thus, Gold users may be automatically routed to server 140a, which for purposes of this example is a server that can provide a relatively high QoS, service greater than servers 140b or 140c. Rather than using the more capable server for all users and degrade its performance, it can be reserved specifically for the highest level subscribers. Server 140b may outperform server 140c, but lack the capabilities of 140a. As a result, server 140b may be reserved for Silver users or Gold and Silver users in times of heavy traffic. Embodiments of the present invention contemplate dynamically modifying or reallocating resources to accommodate the various service levels.

Server 140*c*, having the least capabilities, will be the only server available to Bronze users, or those that pay the lowest subscription rate in one embodiment. These examples are illustrative. By dedicating servers to service levels, a carrier could restrict the number of users allowed on a server to insure a given QoS, even though there may not be any difference in the function of the servers (but there could be a difference, with Gold services being handled by more sophisticated servers). Alternatively, any number of tiers and naming systems can be employed to differentiate users and the services to which they subscribe, limited only by the number of NSPIDs, or combinations thereof, the carrier wishes to purchase.

Figure 2:
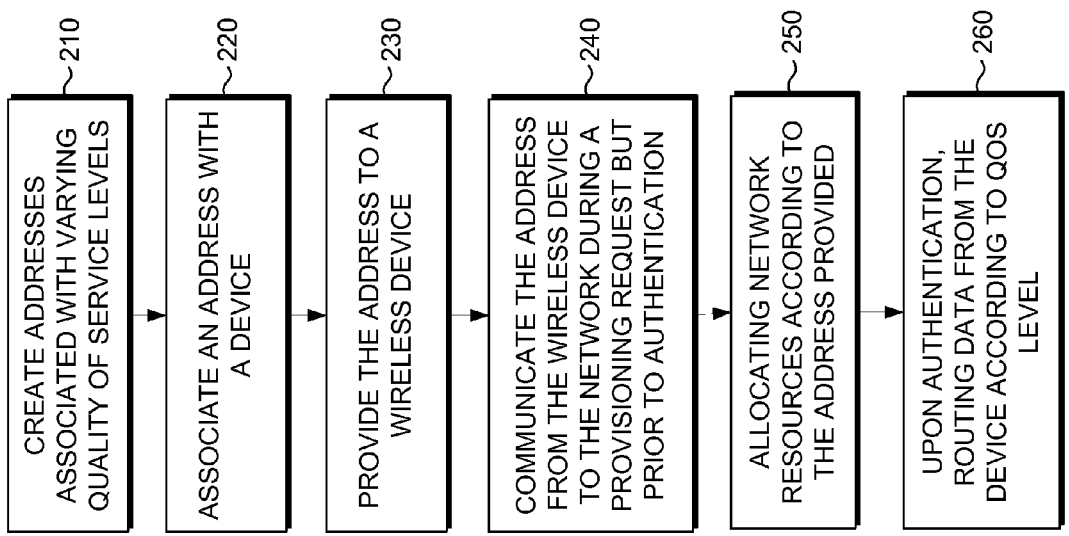
FIG. 2 is a flowchart describing a method in which a network service provider ID may be provided to a WiMAX device according to embodiments of the present invention.

Turning now to FIG. 2, an illustrative method is depicted in which embodiments of the present invention may be practiced. At a step 210, addresses are created and associated with varying levels of QoS. Illustrative addresses can be a phone number or any device identifier that identifies a user or device. This could correspond to the above method of assigning Gold, Silver, and Bronze levels to users based on subscription rates, or any other system for tiered users. As an alternative, job title or description within a corporation could be used as the differentiating factor. Such addresses are associated with a device in step 220 so that the device has an NSPID associated with it. Again, this could be assigned by server 130 shown above, or associated any number of ways, such as locally assigned by a user, or even hardcoded and permanently and automatically associated with a device or with a device component such as a SIM card. Another alternative may be to associate the NSPID with the device so as to package service plans and devices together as part of a cost-saving offer. NSPID 122 may or may not be assigned in a one-time manner, as shown in later figures, with an OMA DM server.

At a step 230, the address is provided to the wireless device. But this can occur before, during, or after a user signs up for a subscription service.

During initialization, the NSPID is communicated from the device, such as device 120, to network 110 during a provisioning request at a step 240. This can be part of or occur prior to an authentication step. As shown in a step 250, the NSPID will dictate a QoS that the user should receive in routing to server resources and authenticating, which can be controlled by dedicated servers. Similarly, a level of QoS could be provided by allocating a certain amount of bandwidth available on network 110. For example, Gold users may have the most bandwidth, and thus least likelihood of failure to authenticate. Upon completion of user authentication, the device is given access to the allocated resources at a step 260 so as to meet the prescribed QoS level dictated by NSPID 122.

Figure 3:
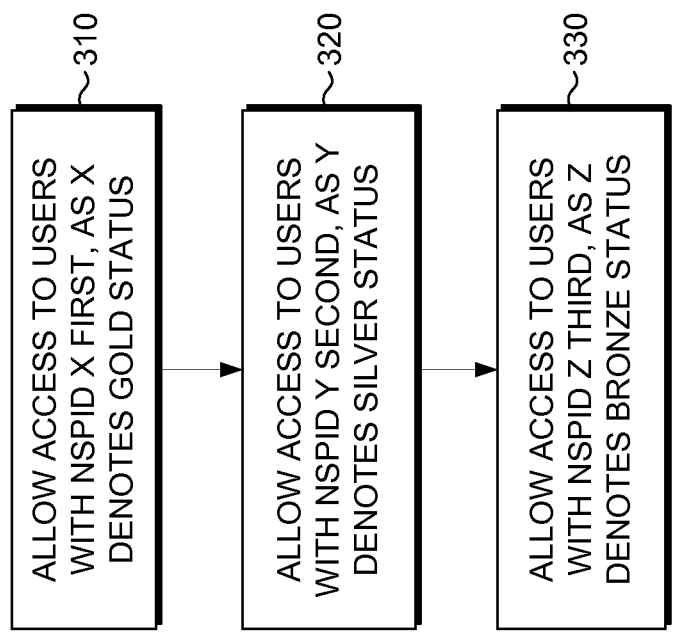
FIG. 3 is a flowchart describing an illustrative method in which a tiered QoS plan may be implemented according to embodiments of the present invention.

Turning now to FIG. 3, an exemplary method is shown to determine access to resources within a telecommunications network, such as wireless network 110. At a step 310, the NSPID of a user is checked prior to authentication by network access equipment to see if it matches a given NSPID, 'X.' This can be accomplished at any of a number of network access points (NAP), such as at a base station or at other points in an Access Service Network (ASN). A NAPID corresponds to, or in some cases is, the radio frequency being generated by an access point and in most cases can identify a carrier. Subordinate to the NAPID is the NSPID in one embodiment. If the device is associated with NSPID X, then the user is given first priority for logging into the network, or initiating a communications session.

Because the NSPID is subordinate to the NAPID, the claimed embodiments of the invention will work even when a user is roaming, or using another provider's network to gain access to the resources of the user's carrier. Thus, the invention allows for the NSPID to grant the user elevated privileges on his or her own network, even if not gaining additional privileges on the network offering the access point. If the user is able to connect to a network that is not the user's own, then the authentication request and subsequent session would be handled at the QoS level denoted by the NSPID. That QoS level would be measured as the user's access from the roaming network to the network resources to which he or she is entitled, rather than from the point at which the user tries to initiate the session. Unlike on the user's own network, however, a device would not be granted precedence to gain initial access to network resources or additional resources on the roaming network.

Step 320 shows a second check in which the ASN monitors for an NSPID Y, which denotes Silver users. If a user is associated with NSPID Y, then that user is given second priority for authentication and use of the network. At a step 330, the ASN checks for NSPID Z, or Bronze users. Those holding NSPID Z are the lowest priority users within that provider's network, and are provided access to the fewest resource offerings.

It is contemplated within the scope of the present invention that a user's QoS level could be elevated when necessary for a fee or on an authorization basis. Therefore, a user that typically does not require highest level QoS may have an important need for two hours, elevate his or her status to a Gold user, then return to Bronze user status once the need has passed. It is also contemplated within the scope of the present invention that a user could insure a QoS level for multiple devices through a single subscription rate.

Figure 4:
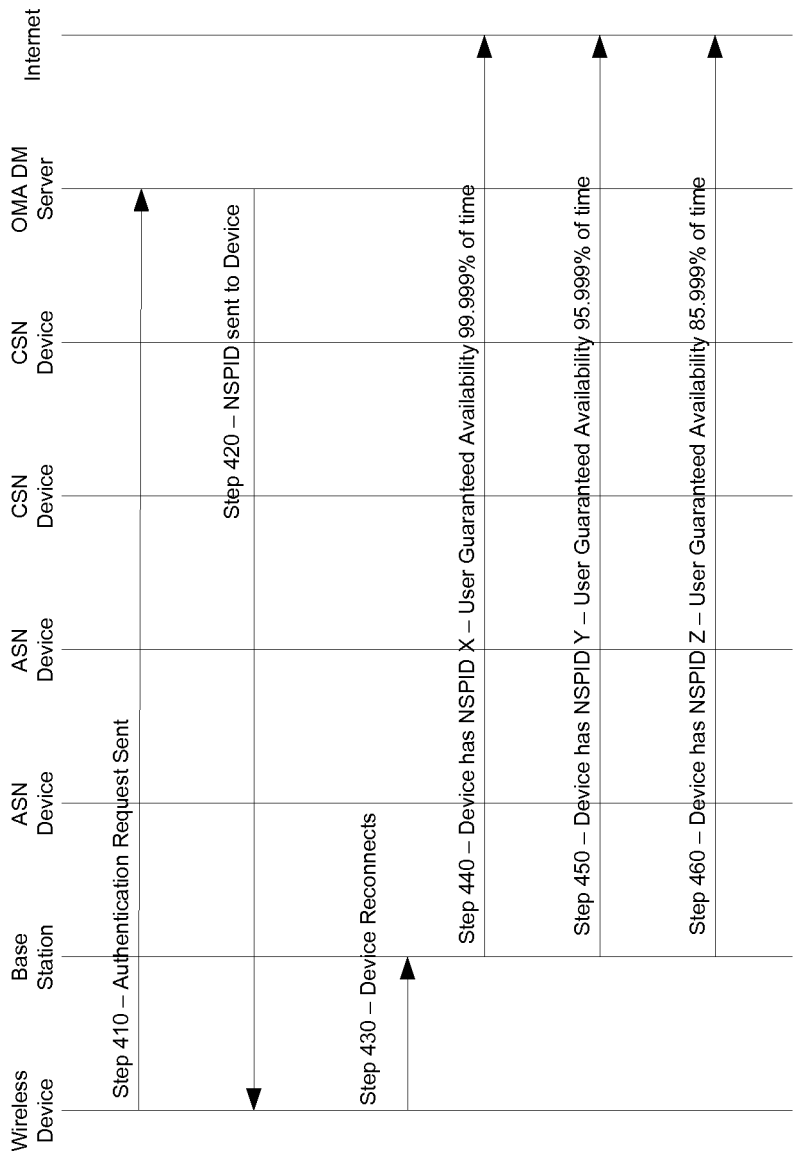
FIG. 4 is a diagram describing illustrative steps by which a device is authenticated to a network according to embodiments of the present invention.

Turning to FIG. 4, a provisioning request is sent from wireless device 120 on wireless network 110 as seen in step 410. An OMA DM server can respond to the request in step 410 with an NSPID to be delivered to wireless device 120 in step 420. When wireless device 120 reconnects with the network as shown in step 430, it can connect with access to one of three QoS levels as shown in steps 440, 450, and 460. If device 120 returns with NSPID X, the device is connected with a highest precedence level shown in step 440. Returning with NSPID Y or Z would result in connecting with a second or third priority level, which is shown in steps 450 and 460, respectively. The QoS levels listed in steps 440-460 are meant to be exemplary in nature and in no way are meant to limit the scope of the claims.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-executable instructions embodied thereon for performing a method of determining an incoming subscriber's Quality of Service (QoS) level prior to authenticating the subscriber, the method comprising:
   creating one or more network-service identifiers that identify a carrier associated with a subscriber, wherein each of the one or more network-service identifiers also identifies one or more resources that are associated with providing varying QoS levels that respectively correspond to the one or more network-service identifiers;
   associating one of the one or more network-service identifiers with a wireless communications device ("device") such that the device is associated with the carrier and with one of the QoS levels;
   communicating the network-service identifier to the device;
   during a provisioning request but prior to completing an authentication process of the device, receiving the network-service identifier from the device;
   during the provisioning request but prior to completing the authentication process of the device, communicating the received network-service identifier to a telecommunications network;
   prior to completing the authentication process of the device, determining which one of the QoS levels is associated with the device based on the network-service identifier received from the device; and
   ultimately conditioning access to the one or more resources that provide a predetermined QoS level consistent with the identifier, wherein the predetermined QoS level consistent with the network-service identifier is provided to the subscriber during the authentication process prior to authentication;
   wherein the QoS level of the subscriber can be changed to a second QoS level for a duration of time and further wherein the second QoS level reverts to the first QoS level at the end of said duration of time.

2. The media of claim 1, wherein the device is a WiMAX-compatible device.

3. The media of claim 1, wherein the network-service identifier is indicative of all devices in a QoS level of the device.

4. The media of claim 3, further comprising:
   determining if the provisioning request is an initial request by the device; and
   communicating the network-service identifier to the device if the request is an initial request.

5. The media of claim 1, wherein associating includes one or more of:
   associating incident to establishing a service plan with the device;
   locally associating the device with the network-service identifier;
   associating the network-service identifier with a component that can be used within the device; and
   permanently coding the device to correspond to the network-service identifier.

6. The media of claim 5, wherein associating includes associating multiple wireless devices with a subscriber.

7. The media of claim 1, wherein the set of resources is not available to a second subscriber of a different QoS level.

8. The media of claim 1, wherein the resources include one or more servers that at least in part are used to service a communications request from the device.

9. The media of claim 1, wherein the resources include a bandwidth allotment available for transmitting data by way of the network.

10. One or more nontransitory computer-readable media having computer-executable instructions embodied thereon for performing a method comprising:
    creating an address that is associated with resources capable of providing a required quality-of-service (QoS) level, wherein the required QoS level is one of a plurality of QoS levels;
    associating a wireless device ("device") with the address that is associated with resources capable of providing the required QoS level;
    receiving a provisioning request from the device, wherein the address is received along with the provisioning request;
    prior to authenticating the device, allocating the resources to the device based on the address;
    prior to authenticating the device, routing the user to the resources such that the user receives the required QoS level during authentication; and
    providing the required QoS level by establishing a communications pathway between the device and the at least a portion of the resources;
    wherein the QoS level provided to the user can be changed to a second QoS level for a duration of time and further wherein the second QoS level reverts to the QoS level at the end of said duration of time.

11. The media of claim 10, wherein the device includes a fourth-generation compliant WiMAX device.

12. The media of claim 10, wherein the resources include one or more dedicated servers providing access to the network.

13. The media of claim 12, wherein servers on the network have different capabilities and are assigned to QoS levels based on those capabilities.

14. The media of claim 10, wherein the resources include a bandwidth allotment for transmitting by way of the network.

15. The media of claim 10, wherein the resources are not available to a subscriber of a lower required QoS level.

16. One or more nontransitory computer-readable media having computer-executable instructions embodied thereon for performing a method of communicating data from a wireless device at a prescribed Quality of Service (QoS) level prior to authentication of the device, the method comprising:
    receiving an address of a wireless communications device ("device"), wherein the address is indicative of the prescribed QoS level, wherein the prescribed QoS level is one of a plurality of QoS levels;
    prior to the authentication of the device, routing data from the device according to the prescribed QoS level indicated by the address of the device, wherein a routing path is determined at least in part based on the prescribed QoS level; and
    providing the device with access to a set of resources consistent with the prescribed QoS level, wherein the set of resources is determined at least in part based on the prescribed QoS level, such that the authentication of the device is performed at the prescribed QoS level;
    wherein the QoS level provided to the device can be changed to a second QoS level for a duration of time and further wherein the second QoS level reverts to the QoS level at the end of said duration of time.

17. The media of claim 16, wherein the device is a WiMAX device.

18. The media of claim 17 further comprising reserving a portion of the network's bandwidth for devices associated with the address in order to meet the prescribed QoS level.

19. The media of claim 17 further comprising routing devices that do not have the address to different resources on the network in order to meet the prescribed QoS level.

* * * * *